United States Patent [19]
Colwell et al.

[11] Patent Number: 5,558,040
[45] Date of Patent: Sep. 24, 1996

[54] BIRD FEEDER

[75] Inventors: Betsy P. Colwell; Wendy A. Wagner, both of Foster, R.I.; Paul Graham, Worcester; John Kline, Brimfield, both of Mass.

[73] Assignee: Droll Yankees, Inc., Foster, R.I.

[21] Appl. No.: 424,118

[22] Filed: Apr. 19, 1995

[51] Int. Cl.[6] ................................................. A01K 39/00
[52] U.S. Cl. ............................................................ 119/52.2
[58] Field of Search ................................. 119/52.2, 52.1, 119/53, 53.5, 54

[56] References Cited

U.S. PATENT DOCUMENTS

| | | | |
|---|---|---|---|
| D. 239,182 | 3/1976 | Kilham. | |
| 503,664 | 8/1893 | Jones | 119/52.2 |
| 609,755 | 8/1898 | Chapin | 119/52.2 |
| 3,102,511 | 9/1963 | Atcheson | 119/52.2 |
| 4,977,859 | 12/1990 | Kilham | 119/52.2 |
| 5,062,388 | 11/1991 | Kilham | 119/52.2 |

*Primary Examiner*—Gene Mancene
*Assistant Examiner*—Thomas Price
*Attorney, Agent, or Firm*—Salter & Michaelson

[57] ABSTRACT

The bird feeder of the present invention includes a feed tray, a housing having bird feed which is disposed above the feed tray, a door which controls the amount of feed delivered from the housing to the feed tray, a cover disposed above the housing and means mounting these components on a pole. The housing has downwardly sloping channels formed therein which extend radially outwardly, and feed apertures formed at its lower end which are circumferentially spaced and aligned with the channels. The door is rotatably secured to the housing and includes openings which register with the feed apertures of the housing for allowing bird feed to pass through the feed apertures and onto the feed tray. The door is rotatably movable between an open position and a closed position.

20 Claims, 6 Drawing Sheets

BIRD FEEDER

BRIEF SUMMARY OF THE INVENTION

This invention relates generally to bird feeders and more particularly to a bird feeder which is designed for preventing its contents (i.e., bird seed) from being accessed by rodents, such as squirrels, chipmunks and the like and for easy assembly and disassembly.

The instant invention relates to bird feeders of the general type having a cylindrical housing preferably constructed of a suitable plastic material, and having adjustable feed ports at a lower extremity thereof, with a feed tray located beneath the feed ports for collecting bird feed that spills outwardly through the ports and at the same time for supporting the type of birds for which this feeder is designed. Feeders of this general type are known in the prior art, but assembly and disassembly of such feeders during cleaning frequently is a problem. This is especially true for feeders which are designed to keep rodents away from the bird feed since these feeders may be complicated in design and in assembly.

It is therefore an object of this invention to provide such a feeder wherein the component parts can easily and quickly be assembled and disassembled without the aid of tools. It is also an object to provide such a feeder which effectively prevents rodents, such as squirrels, chipmunks and the like from accessing the bird seed.

The bird feeder of the present invention comprises a feed tray, a housing having bird feed which is disposed above the feed tray, a door which controls the amount of feed delivered from the housing to the feed tray, a cover disposed above the housing and means mounting these components on a pole. The feed tray of the feeder comprises a sleeve adapted to be slidably received on a pole, and a circumferential skirt extending radially outwardly from the sleeve. The skirt is constructed and arranged for receiving bird feed delivered from the housing. The feed tray further comprises an inverted U-shaped edge outer flange which functions to keep bird feed within the skirt of the feed tray and to prevent rodents from accessing the housing of the bird feeder from underneath the feed tray. The housing comprises a plurality of downwardly sloping channels formed therein which extend radially outwardly, and a plurality of feed apertures formed at its lower end which are circumferentially spaced and aligned with the channels. The arrangement is such that bird feed stored within the housing flows down the channels through the feed apertures and into the feed tray. The annular door is rotatably secured to the underside of the housing and comprises a plurality of openings formed therein which register with the feed apertures of the housing for allowing bird feed to pass through the feed apertures. The door is rotatably movable between an open position in which the openings of the door are aligned with the feed apertures of the housing for allowing a maximum amount of bird feed to flow into the feed tray, and a closed position in which the wall of the door blocks the feed apertures for preventing the bird feed from flowing into the feed tray, or to an in between position wherein the amount of bird seed may be selectively adjusted. A top cover is slidably mounted on the pole for blocking the open upper end of the housing. The cover is adapted to be slidably moved upwardly away from the housing for allowing access into the housing.

More specifically, the housing comprises a vertically disposed cylindrical wall having an upper end and a lower end, and a bottom wall attached to the lower end of the cylindrical wall. The bottom wall has the aforementioned channels formed therein and the cylindrical wall has the feed apertures formed therein at its lower end. The door comprises an outer peripheral wall, a bottom and means associated with the door and housing for rotatably securing the door to the housing for rotational movement relative to the housing. The outer wall is positioned radially outwardly with respect to the cylindrical wall of the housing and has the openings formed therein which register with the feed apertures. The rotatable securing means associated with the door and housing comprises a first cylindrical sleeve centrally mounted on the bottom of the door for mounting the door on the pole and a pair of oppositely positioned openings formed in the bottom of the door. The openings are positioned adjacent the first sleeve on opposite sides thereof. A second cylindrical sleeve, centrally mounted on the bottom wall of the housing, has a pair of oppositely positioned, downwardly extending locking tongs formed thereon at the lower end of the second sleeve. The second sleeve is sized for sliding over the first sleeve of the door in a position where the locking tongs extend through the openings in the bottom of the door and resiliently engage the first sleeve of the door for securing the door to the housing. The openings of the bottom of the door have a greater widthwise dimension than the widthwise dimension of the locking tongs for allowing relative rotation of the door with respect to the housing whereby lateral edges of the openings limit the rotation of the door.

The mounting means comprises a clamp releasably mounted on the pole below the bird feeder for preventing the downward movement of the bird feeder on the pole and a second clamp releasably mounted on the pole above the bird feeder for preventing the upward movement of the cover.

Among the several objects of the present invention are the provision of an improved bird feeder in which the essential components thereof may be quickly and easily assembled without the aid of any tools; the provision of such a bird feeder which is designed to keep rodents away from bird feed contained in a housing thereof and away from bird feed which spills onto a feed tray; the provision of such a bird feeder which when once assembled is securely maintained in assembled relation without any appreciable likelihood of inadvertent separation of its component parts; and the provision of such a bird feeder which is highly effective for feeding relatively small birds, which is relatively easy to manufacture and assemble, and which is cost-efficient to make.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding references designate corresponding parts throughout the several views of the drawings.

DETAILED DESCRIPTION OF THE PREFERRED EMBODIMENT

Figure 1:
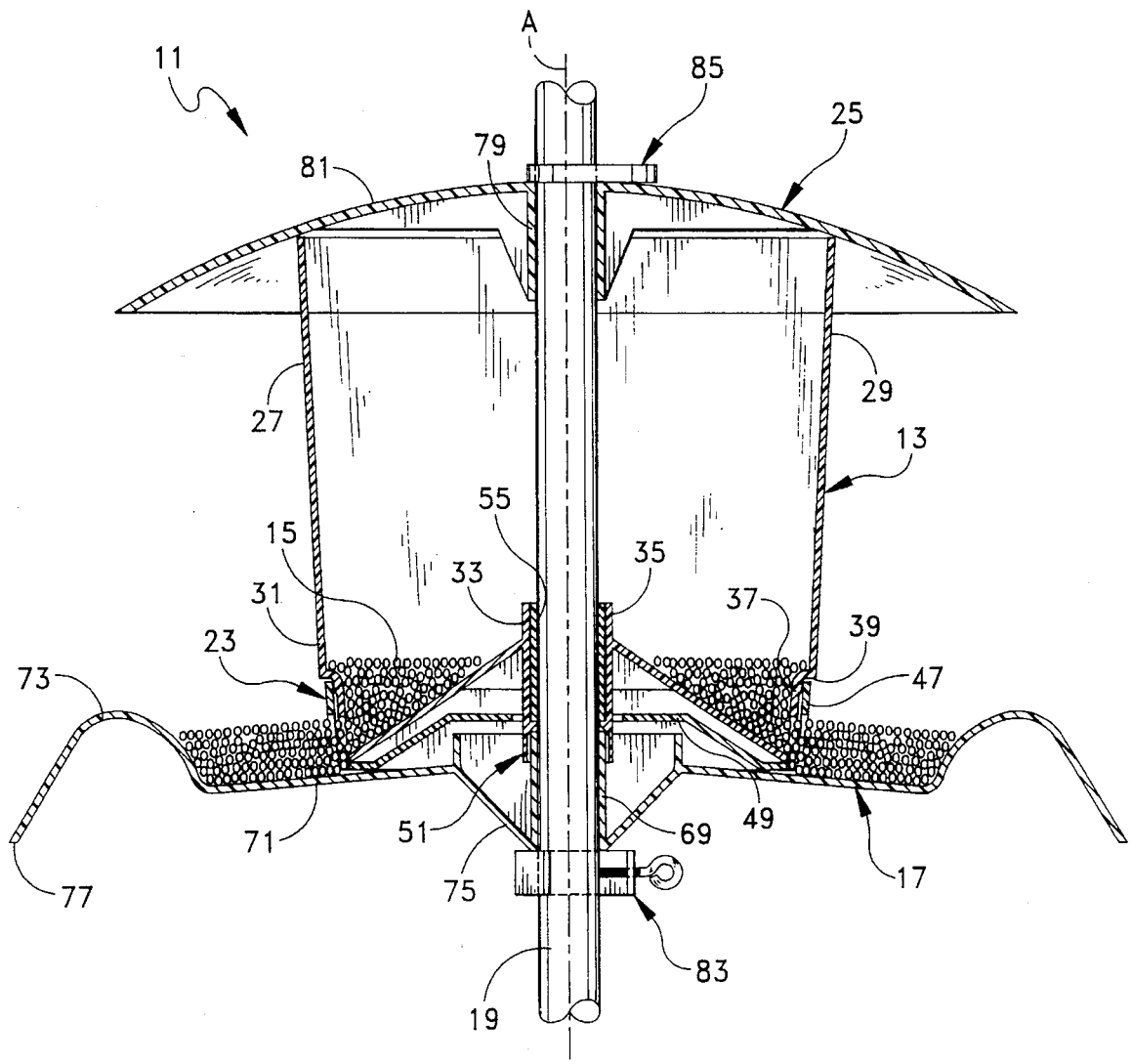
FIG. 1 is a cross section, elevational view of a bird feeder of the present invention mounted on a pole.

Referring to the drawings, and more particularly to FIG. 1, there is generally indicated at 11 a bird feeder of the present invention. As shown, the bird feeder 11 comprises a cylindrical housing, generally indicated at 13, which receives and stores bird feed 15 (e.g., seed) therein, a feed tray, generally indicated at 17, which is located below the housing 13 for collecting bird feed 15 that spills from the housing 13 and at the same time supports the type of birds for which this feeder is designed, and means embodying clamping devices for mounting the bird feeder 11 on a pole 19. An annular door, generally indicated at 23, is rotatably secured to the housing 13 for controlling the amount of feed 15 that spills from the housing 13 into the feed tray 17. A cover, generally indicated at 25, overlies the open top end of the housing 13 for preventing unwanted elements from accessing bird feed 15 housed therein. The bird feeder 11 of the present invention is especially designed to prevent the bird feed 15 contained in the housing 13 and within the feed tray 17 from being accessed by rain or by rodents, such as squirrels, chipmunks and the like. The feeder 11 is also especially suited for being quickly and easily assembled and disassembled for cleaning purposes or minor repair, for example.

Figure 2:
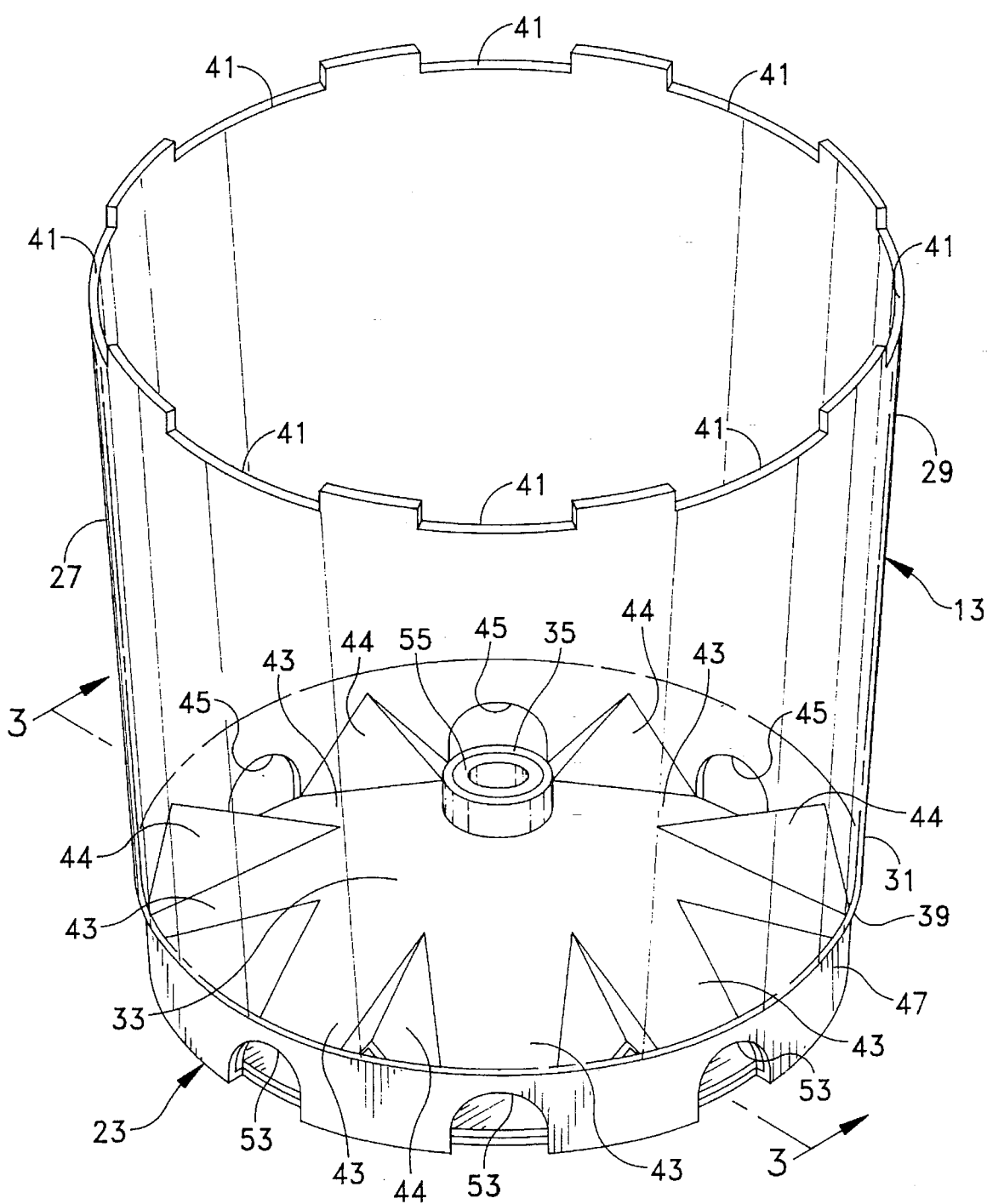
FIG. 2 is a perspective view of the housing and door assembly of the bird feeder.
Figure 3:
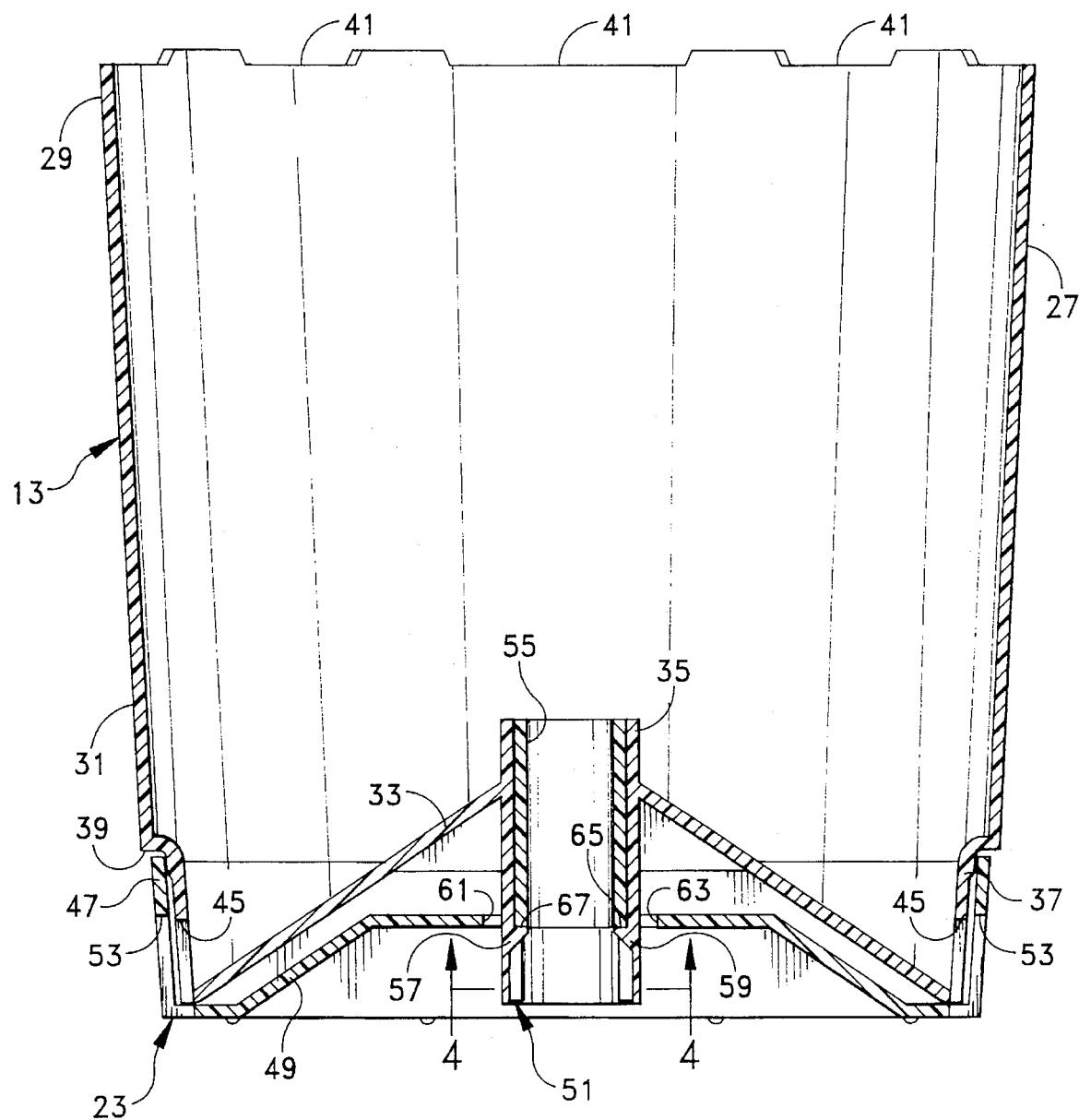
FIG. 3 is a cross-sectional view taken along line 3—3 of FIG. 2.
Figure 5:
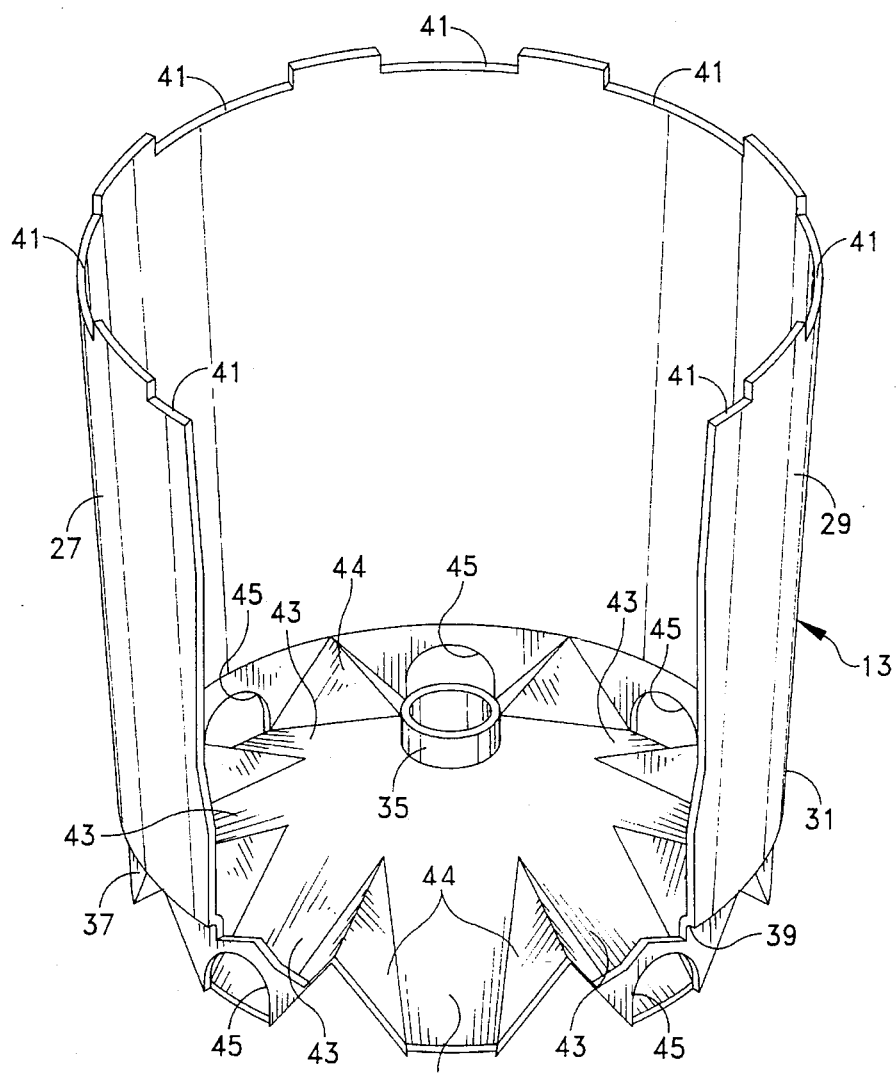
FIG. 5 is a perspective view of the housing of the bird feeder with portions removed to illustrate the interior of the housing more clearly.
Figure 6:
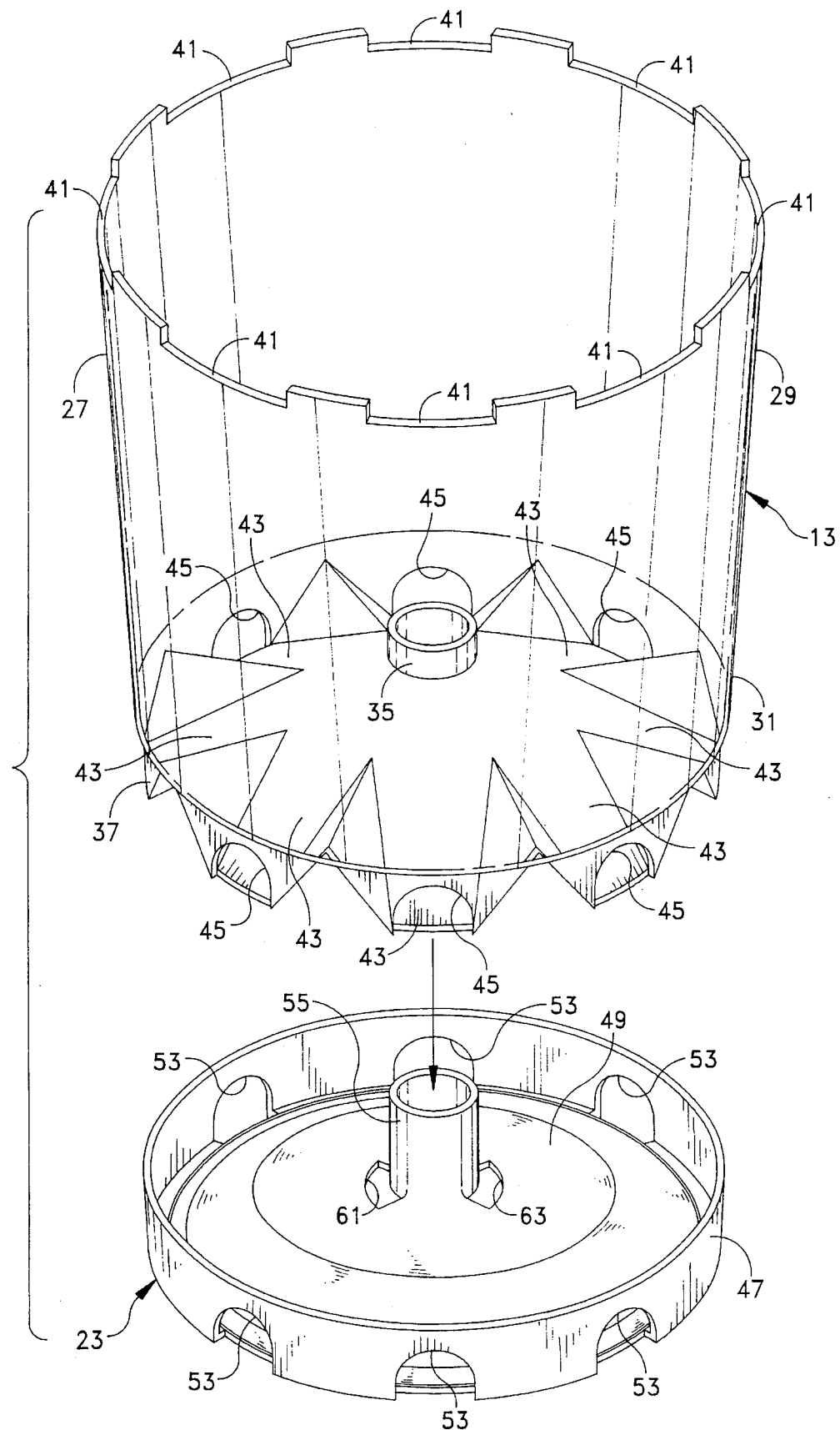
FIG. 6 is an exploded perspective view of the bird feeder illustrating the housing and the annular door assembly.

Referring now to FIGS. 2, 3 and 5, the housing 13 of the bird feeder comprises a vertically disposed cylindrical wall 27 having an upper open end 29 and a lower end 31. A bottom wall 33 attached to the lower end 31 of the cylindrical wall 27 closes the lower end 31 of the housing 13. A cylindrical sleeve 35 (sometimes referred to as the "second sleeve") is centrally mounted on the bottom wall 33 of the housing 13 and is integrally formed therewith. The housing 13 is preferably fabricated from clear, polycarbonate material which is resistant to ultraviolet light. As shown, the housing 13 is relatively large and is designed to store a relatively large amount of bird feed 15. The cylindrical wall 27 is slightly tapered and includes at its lower end 31 a reduced diameter portion 37 and a circumferential lip 39 at the transition of the reduced diameter portion 37 and the remainder of the cylindrical wall 27. The purpose of this construction will become apparent as the description of the bird feeder 11 proceeds. The upper edge of the cylindrical wall 27 is scalloped at 41 so as to provide narrow slots when the cover 25 overlies the open upper end 29 of the wall 27 of the housing 13 through which air may enter and circulate within the feeder 11 for reducing moisture within the feeder.

The bottom wall 33 of the housing 13 is formed with eight downwardly sloping channels 43 which extend radially outwardly from the centrally located cylindrical sleeve 35. Specifically the channels 43 are defined by integrally molded partitions 44 formed on bottom wall 33. The cylindrical wall 27 has eight corresponding feed apertures 45 formed at its lower end 31 in the reduced diameter portion 37 which are circumferentially spaced and aligned with the channels 43 of the bottom wall 33. It should be understood that the bird feeder 11 of the present invention may be adapted with any number of channels and feed apertures and still fall within the scope of the present invention. The sloped channels 43 keep bird feed 15 at the feed apertures 45 at all times and keep feed 15 from stagnating in the feeder 11. The feed tray 17 is located proximate to the feed apertures 45 so that the bird feed 15 stored within the housing 13 flows down the channels 43 through the feed apertures 45 and into the feed tray 17. The outer peripheral edge of the bottom wall 33 may be integrally formed with the cylindrical wall 27 or attached thereto by any suitable means. As illustrated, the sleeve 35 of the housing 13 extends along a vertical axis A.

The door 23 of the bird feeder 11 is preferably fabricated from the same material as the housing 13 and comprises an outer peripheral wall 47 tapered at a similar angle to the cylindrical wall 27 of the housing 13, a bottom 49 attached to the outer wall 47, and means, generally indicated at 51, associated with the door 23 and the housing 13 for rotatably securing the door to the housing. As illustrated, the outer wall 47 of the door 23 is positioned radially outwardly with respect to the reduced diameter portion 37 of the cylindrical wall 27 of the housing 13 in close adjacency therewith. The outer wall 47 has eight openings 53 formed therein which register with the feed apertures 45 of the housing 13 for allowing bird feed 15 to pass through the feed apertures 45 and into the feed tray 17. More particularly, the door 23 is rotatable with respect to the housing 13 between an open position in which the openings 53 of the door 23 are aligned, or partially aligned, with the feed apertures 45 of the housing 13 for allowing a selected amount of bird feed 15 to flow into the feed tray 17, and a closed position in which the wall 47 of the door 23 covers or blocks the feed apertures 45 for preventing the bird feed 15 from flowing into the feed tray 17. Thus, when the feed tray 17 is filled with a sufficient quantity of bird feed 15, the door 23 may be rotated to its closed position to prevent any additional feed 15 from spilling into the feed tray 17. An additional feature of this design is that the size of the feed aperture 45 may be adjusted for accommodating different sizes of bird feed. This is accomplished by rotating the door 23 so that its openings 53 are partially aligned with the feed apertures 45. As illustrated in FIG. 3, the lip 39 of the housing 13 overlies the upper edge of the wall 47 of the door 23 for substantially preventing unwanted elements, such as rainfall, from entering the top of the door 23 thereby protecting the bird feed 15 stored inside the housing 13.

Similar to the housing 13, the door 23 of the bird feeder 11 also comprises a cylindrical sleeve 55 (sometimes referred to as the "first sleeve") which is centrally located and integrally formed with the bottom 49 of the door 23 so that it extends along axis A. As illustrated in FIG. 1, this sleeve 55 is sized for receiving the pole 19 therethrough for mounting the bird feeder 11 on the pole 19. Preferably, the sleeve 55 is sized for a close clearance/interference fit so that it is snugly mounted on the pole 19 and does not move laterally with respect thereto.

As illustrated in FIG. 3, the sleeve 35 of the housing 13 is sized for sliding over the sleeve 55 of the door 23, there being a slight clearance fit between the door sleeve 55 and the housing sleeve 35. It should be noted that the fit between sleeves 35, 55 should not be too close since the housing 13 and door 23 are designed to be easily and quickly disassembled.

The rotatable securing means 51 comprises two oppositely positioned, downwardly extending locking tongs 57, 59 formed on the sleeve 35 of the housing 13. When sliding the sleeve 35 of the housing 13 over the sleeve 55 of the door 23, the locking tongs 57, 59 extend through respective openings 61, 63 formed in the bottom 49 of the door 23 and resiliently snap in beneath the sleeve 55 of the door 23 for securing the door 23 to the housing 13. More specifically, the sleeve 55 of the door 23 has a downwardly facing engaging surface 65 and the locking tongs 57, 59 of the housing 13 each have a shoulder portion 67 which is designed to interlock with the engaging surface 65 of the sleeve 55 of the door 23 when the housing 13 is slid over the door 23. The arrangement is such that when sliding the sleeve 35 of the housing 13 over the sleeve 55 of the door 23, the locking tongs 57, 59 resiliently engage the sleeve 55 of the door 23 and upon clearing the bottom of the sleeve 55, the shoulder portions 67 of the locking tongs 57, 59 move radially inwardly into interlocking engagement with the engaging surface 65 of the sleeve 55 of the door 23.

Figure 4:
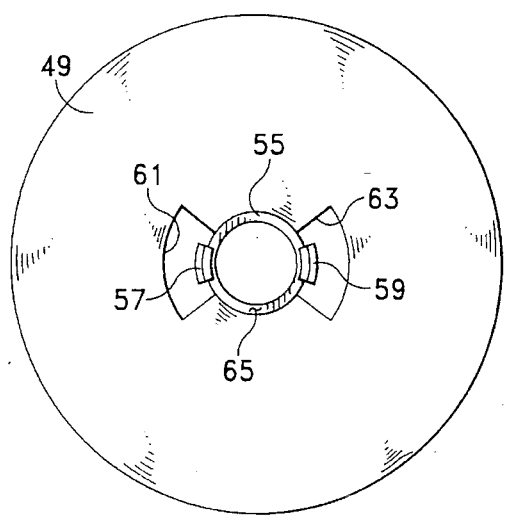
FIG. 4 is a cross-sectional view taken along line 4—4 of FIG. 3.

The openings 61, 63 formed in the bottom 49 of the door 23 have a greater widthwise dimension than the widthwise dimension of their respective locking tongs 57, 59 which is illustrated in FIG. 4. More particularly, the width of each opening 61, 63 is slightly greater than two times the width of each locking tong 57, 59 so that when the door 23 is rotated, it can only move between its fully opened and closed positions. Lateral edges of the openings 61, 63 limit the rotation of the door 23 between its fully opened and closed positions.

Referring back to FIG. 1, the feed tray 17 is fabricated from suitable plastic material which is corrosion resistant (or applied with a corrosion resistant material) and comprises a centrally located sleeve 69 which extends along axis A, a circumferential skirt 71 extending radially outwardly from the sleeve 69, and an inverted U-shaped outer flange 73 extending radially outwardly from the skirt 71. As shown, the sleeve 69 of the feed tray 17 is slidably received on the pole 19 in a position where it is below the housing 13 and door 23. More particularly, an upper edge of the sleeve 69 engages the locking tongs 57, 59 of the housing 13 for supporting the housing 13 and door 23 at a desired elevation along the length of the pole 19. A frustroconical-shaped structural element 75 is provided between the sleeve 69 and the skirt 71 for strengthening the feed tray 17 so that it is capable of supporting the housing 13, door 23 and cover 25.

The skirt 71 is constructed and arranged for receiving bird feed 15 that spills from the feed apertures 45 of the housing 13 when the door 23 is in its open or partially open position. The skirt 71 has a relatively large diameter so that the housing 13 and door 23 rest easily thereon and there is sufficient space to receive bird feed 15 thereon. The outer flange 73 functions to keep bird feed 15 within the skirt 71 of the feed tray 17. This flange 73 is also shaped to prevent rodents from accessing the feed 15 provided in the housing 13 and on the skirt 71 from underneath the feed tray 17. The downwardly depending end 77 of the flange 73 prevents rodents from being able to climb over the feed tray 17 to access the bird feed 15.

The cover 25 is also fabricated from suitable plastic material and comprises a downwardly extending sleeve 79 and an arcuate wall 81 extending radially outwardly from the upper edge of the sleeve 79 at a downwardly sloping angle. As with the sleeves 55, 69 of the door 23 and feed tray 17, respectively, the sleeve 79 of the cover 25 is slidably received over the pole 19. The arcuate wall 81 of the cover 25 engages the upper edge of the cylindrical wall 27 of the housing 13 and bears against the wall 27 for closing the open top of the housing 13 thereby preventing access into the interior of the housing 15 which contains feed 15. The cover prevents unwanted elements (e.g., rodents, rainfall, etc.) from entering the housing 13, although the narrow slots provided by scallops 41 between the cover 25 and the housing 13 allow air to enter and circulate within the feeder 11 for reducing moisture within the feeder. The arcuate wall 81 of the cover 25 has a sufficient diameter so that its peripheral edge substantially overlies the skirt 71 of the feed tray 17 for directing rainfall away from bird feed 15 contained within the skirt 71.

Figure 7:
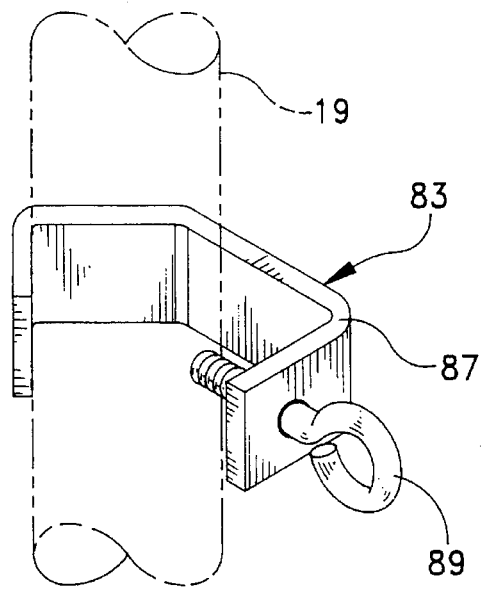
FIG. 7 is an enlarged detail of a lower clamp used to support the bird feeder on the pole.

The mounting means of the present invention comprises a pair of clamps, a lower clamp generally indicated at 83 which is located below the feed tray 17, and an upper clamp generally indicated at 85 which is located above the cover 25. The lower clamp 83 is releasably mounted on the pole 19 below the feed tray 17 for supporting the bird feeder 11 thereon and preventing the downward movement of the bird feeder 11 on the pole 19. The bird feeder 11 may be mounted on the pole 19 at any desired elevation by securing the lower clamp 83 at the appropriate elevation. As illustrated in FIG. 7, the lower clamp 83 comprises a metal bracket 87 suitably bent to receive the pole 19 therethrough and a screw fastening element 89 having a closed loop head which may be turned by hand for tightening the clamp 83 onto the pole. This type of clamp, which is well-known in the art of fasteners, has been found to be of sufficient strength for supporting the bird feeder 11 and its component parts. It is also particularly suitable since it may be tightened and loosened by hand.

Figure 8:
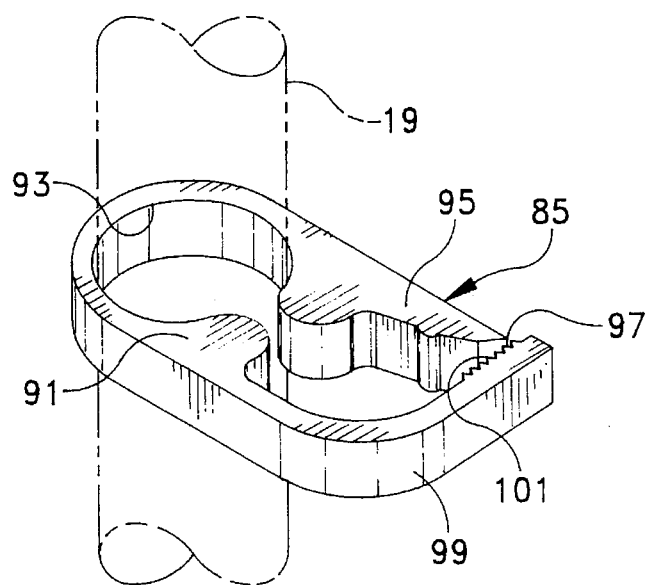
FIG. 8 is an enlarged detail of an upper clamp used to secure the bird feeder on the pole.

The upper clamp 85 is illustrated in FIG. 8 and comprises a resilient, generally 0-shaped member 91 having an opening 93 sized for receiving the pole 19 therethrough, and an end portion 95 having an outer bladed end 97 which is engagable with an opposite end portion 99 having teeth 101. As illustrated, the bladed end 97 of end portion 95 is adapted to engage the teeth 101 of end portion 99 for maintaining a tight clamping force of the member 91 on the pole 19. The upper clamp 85 is released from the pole 19 by forcing end portion 99 outwardly away from end portion 95 thereby disengaging end 97 from teeth 101, this being permitted by the inherent resilience of clamp 85.

To assemble the bird feeder 11, the lower clamp 83 is secured to the pole 19 by tightening the screw fastening element 89 by hand at a desired location along the length of the pole 19. Preferably, the bird feeder 11 should be supported at least four feet off the ground and be positioned away from any trees adjacent the feeder. The feed tray 17 is then slipped over the pole 19 until the sleeve 69 of the feed tray 17 engages and rests upon the metal bracket 87 of the lower clamp 85. Next, the sleeve 35 of the housing 13 is slipped over the sleeve 55 of the door 23 in such a manner that the locking tongs 57, 59 of the housing 13 enter the openings 61, 63 formed in the bottom 49 of the door 23 and the shoulder portions 67 of the tongs 57, 59 engage the engaging surface 65 of the sleeve 55 of the door 23. This assembly is then slipped over the pole 19 in such a manner that the sleeve 55 of the door 23 slidably receives the pole 19 therethrough and is lowered until the locking tongs 57, 59 engage the upper end of sleeve 69 of the feed tray 17. After positioning the housing 13 and door 23 on the feed tray 17, the cover 25 is then slipped over the pole 19 in a like manner until the arcuate wall 81 of the cover 25 bears against the cylindrical wall 27 of the housing 13. The upper clamp 85 is then secured to the pole 19 to prevent the cover 25 from being removed.

It should be noted that the bird feeder 11 of the present invention can be easily disassembled for accessing the interior of the housing 13 in order to add more bird feed 15 therein or for removing the housing 13 and door 23 assembly for cleaning purposes. To remove the cover 25, the upper clamp 85 is removed from the pole 19 by moving the end portion 99 of the clamp 85 away from end portion 97 thereby disengaging them from one another. The clamp 85 can then be slidably moved upwardly along the pole 19 away from the cover 25. Next, the cover 25 can be slidably moved upwardly away from the housing 13 wherein bird feed 15 may be added by pouring it into the housing 13. The cover 25 and clamp 85 are reassembled in the manner described above.

For cleaning the housing 13, door 23 and feed tray 17, the upper clamp 85 and cover 25 are completely removed from the pole 19 and the housing 13, door 23 and feed tray 17 can be moved upwardly until they are also completely removed therefrom. The housing 13 can be disassembled from the door 23 by forcing the resilient locking tongs 57, 59 outwardly and axially moving the housing 13 upwardly until the locking tongs 57, 59 clear the upper end of the sleeve 55 of the door 23. Thus, the component parts of the feeder 11 may be readily cleaned or replaced and reassembled in the manner set forth above for mounting on the pole 19.

It should also be noted that the bird feeder 11 of the present invention is especially effective in keeping rodents away from the bird feed 15 in that the cover 25 prevents access to the feed 15 from above the feeder 11 and the feed tray 17 prevents access thereto from below the feeder.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A bird feeder capable of storing bird feed therein and delivering the bird feed to a feed tray located below the bird feeder, said bird feeder comprising:
   a housing comprising a vertically disposed cylindrical wall having an upper end and a lower end, and a bottom wall attached to the lower end of the cylindrical wall, said bottom wall having a plurality of downwardly sloping channels formed therein which extend radially outwardly, said cylindrical wall having a plurality of feed apertures formed at its lower end which are circumferentially spaced and aligned with said channels of the bottom wall wherein bird feed stored within the housing flows down the channels through the feed apertures and into the feed tray; and
   an annular door rotatably secured to the housing, said door comprising an outer peripheral wall, a bottom, and means associated with the door and housing for rotatably securing the door to the housing for rotational movement relative to the housing, said outer wall being positioned radially outwardly with respect to the cylindrical wall of the housing and having a plurality of openings formed therein which register with the feed apertures of the housing for allowing bird feed to pass through the feed apertures, said door being rotatably movable between an open position in which the openings of the door are fully aligned with the feed apertures of the housing for allowing bird feed to flow into the feed tray, and a closed position in which the wall of the door blocks the feed apertures for preventing the bird feed from flowing into the feed tray.

2. The bird feeder as set forth in claim 1, said door having a first cylindrical sleeve mounted on the bottom of the door, and said housing having a second cylindrical sleeve mounted on the bottom wall of the housing, said second sleeve of the housing being sized for sliding over the first sleeve of the door wherein said rotatable securing means maintains the door in assembled relation with the housing.

3. The bird feeder as set forth in claim 2, said rotatable securing means comprising engaging means of the second sleeve of the housing which interlockingly engages engaging means of the first sleeve of the door, said engaging means of the first and second sleeves being adapted to maintain said assembled relation while enabling the door to rotate about the housing.

4. The bird feeder as set forth in claim 3, said engaging means of the first cylindrical sleeve of the door comprising a pair of oppositely positioned openings formed in the bottom of the door, said openings being positioned adjacent the first sleeve on opposite sides thereof, and said engaging means of the second cylindrical sleeve of the housing comprising a pair of oppositely positioned, downwardly extending locking tongs formed thereon at the lower end of the second sleeve, wherein as the second sleeve slides over the first sleeve of the door, the locking tongs extend through the openings in the bottom of the door and resiliently engage the first sleeve of the door for assembling the door to the housing.

5. The bird feeder as set forth in claim 4, said first sleeve of the door having a downwardly facing engaging surface and said locking tongs of the housing each having a shoulder portion adapted to engage the engaging surface of the first sleeve of the door, wherein the locking tongs resiliently engage the first sleeve when sliding the second sleeve of the housing over the first sleeve of the door, and upon clearing the first sleeve, the shoulder portions of the locking tongs move radially inwardly into interlocking relation with the engaging surface of the first sleeve of the door.

6. The bird feeder as set forth in claim 4, said openings of the bottom of the door having a greater widthwise dimension than the widthwise dimension of the locking tongs for allowing relative rotation of the door with respect to the housing whereby lateral edges of the opening limit the rotation of the door.

7. The bird feeder as set forth in claim 2 further comprising means supporting the housing and door on a pole, said pole being received through the first sleeve of the door.

8. The bird feeder as set forth in claim 7, said mounting means comprising a clamp releasably mounted on the pole below the bird feeder for preventing the downward movement of the bird feeder on the pole.

9. The bird feeder as set forth in claim 7 further comprising a top cover slidably mounted on the pole for covering the open upper end of the housing, said cover being adapted to be slidably moved upwardly away from the housing for allowing access into the housing.

10. The bird feeder as set forth in claim 9, said mounting means further comprising a second clamp releasably mounted on the pole above the bird feeder for preventing the upward movement of the cover.

11. The bird feeder as set forth in claim 1, said cylindrical wall of the housing, at its lower end, having a reduced diameter portion which rotatably receives the outer wall of the door thereover, and a circumferential lip at the junction of the reduced diameter portion and the upper end of the cylindrical wall, said lip overlying the upper edge of the door for substantially preventing unwanted elements, such as rainfall, from entering the door thereby protecting the bird feed.

12. A bird feeder mounted on a pole, said bird feeder comprising:
   a feed tray comprising a sleeve adapted to be slidably received on a pole, and a circumferential skirt extending radially outwardly from the sleeve, said skirt being constructed and arranged for receiving bird feed;
   a housing comprising a plurality of downwardly sloping channels formed therein which extend radially outwardly, and a plurality of feed apertures formed at its lower end which are circumferentially spaced and aligned with said channels, wherein bird feed stored within the housing flows down the channels through the feed apertures and into the feed tray;
   an annular door rotatably secured to the housing comprising a plurality of openings formed therein which register with the feed apertures of the housing for allowing bird feed to pass through the feed apertures, said door being rotatably movable between an open position in which the openings of the door are fully aligned with the feed apertures of the housing for allowing bird feed to flow into the feed tray, and a closed position in which the wall of the door blocks the feed apertures for preventing the bird feed from flowing into the feed tray, said housing and door being slidably mounted on the pole;
   a top cover slidably mounted on the pole for blocking the open upper end of the housing, said cover being adapted to be slidably moved upwardly away from the housing for allowing access into the housing; and
   means mounting the feed tray, housing, door, and cover to the pole.

13. The bird feeder as set forth in claim 12, said housing comprising a vertically disposed cylindrical wall having an upper end and a lower end, and a bottom wall attached to the lower end of the cylindrical wall, said bottom wall having said channels formed therein and said cylindrical wall having said feed apertures formed therein at its lower end.

14. The bird feeder as set forth in claim 13, said door comprising an outer peripheral wall, a bottom and means associated with the door and housing for rotatably securing the door to the housing for rotational relative movement, said outer wall being positioned radially outwardly with respect to the cylindrical wall of the housing and having said openings formed therein adapted to register with the feed apertures.

15. The bird feeder as set forth in claim 14, said door having a first cylindrical sleeve mounted on the bottom of the door, and said housing having a second cylindrical sleeve mounted on the bottom wall of the housing, said second sleeve of the housing being sized for sliding over the first sleeve of the door wherein said rotatable securing means maintains the door in assembled relation with the housing.

16. The bird feeder as set forth in claim 15, said rotatable securing means comprising engaging means of the second sleeve of the housing which interlockingly engages engaging means of the first sleeve of the door, said engaging means of the first and second sleeves being adapted to maintain said assembled relation while enabling the door to rotate about the housing.

17. The bird feeder as set forth in claim 16, said engaging means of the first cylindrical sleeve of the door comprising a pair of oppositely positioned openings formed in the bottom of the door, said openings being positioned adjacent the first sleeve on opposite sides thereof, and said engaging means of the second cylindrical sleeve of the housing comprising a pair of oppositely positioned, downwardly extending locking tongs formed thereon at the lower end of the second sleeve, the arrangement being such that as the second sleeve slides over the first sleeve of the door, the locking tongs extend through the openings in the bottom of the door and resiliently engage the first sleeve of the door for assembling the door to the housing.

18. The bird feeder as set forth in claim 17, said openings of the bottom of the door having a greater widthwise dimension than the widthwise dimension of the locking tongs for allowing relative rotation of the door with respect to the housing whereby lateral edges of the openings limit the rotation of the door.

19. The bird feeder as set forth in claim 12, said feed tray further comprising an inverted U-shaped edge outer flange which functions to keep bird feed within the skirt of the feed tray and prevent rodents from accessing the housing of the bird feeder from underneath the feed tray.

20. The bird feeder as set forth in claim 12, said cover comprising a downwardly extending sleeve and an arcuate wall extending radially outwardly from the sleeve in such a manner that the arcuate wall overlies said open upper end of the housing and the skirt of the feed tray.

* * * * *